(12) United States Patent
Maesen et al.

(10) Patent No.: US 8,383,543 B2
(45) Date of Patent: Feb. 26, 2013

(54) HYDROCONVERSION MULTI-METALLIC CATALYST AND METHOD FOR MAKING THEREOF

(75) Inventors: Theodorus Maesen, Richmond, CA (US); Alexander E. Kuperman, Orinda, CA (US); Dennis Dykstra, Pinole, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 335 days.

(21) Appl. No.: 12/770,388

(22) Filed: Apr. 29, 2010

(65) Prior Publication Data

US 2010/0279849 A1 Nov. 4, 2010

Related U.S. Application Data

(63) Continuation-in-part of application No. 12/432,723, filed on Apr. 29, 2009, now Pat. No. 7,931,799, and a continuation-in-part of application No. 12/432,728, filed on Apr. 29, 2009, now Pat. No. 7,964,526, and a continuation-in-part of application No. 12/432,730, filed on Apr. 29, 2009, now Pat. No. 8,080,492.

(51) Int. Cl.
  *B01J 31/00* (2006.01)
  *B01J 27/045* (2006.01)
  *B01J 27/047* (2006.01)
  *B01J 27/14* (2006.01)
  *B01J 27/24* (2006.01)

(52) U.S. Cl. ........ 502/154; 502/216; 502/219; 502/220; 502/221; 502/152; 502/161; 502/168; 502/170; 502/208; 502/209; 502/210; 502/211; 502/213; 502/223

(58) Field of Classification Search .......... 502/216, 502/219, 220, 221, 152, 154, 161, 168, 170, 502/208, 209, 210, 211, 213, 223
See application file for complete search history.

(56) References Cited

U.S. PATENT DOCUMENTS

| | | | |
|---|---|---|---|
| 3,673,079 A | 6/1972 | Mulaskey et al. |
| 3,709,814 A | 1/1973 | Jaffe |
| 3,763,079 A | 10/1973 | Fryd |
| 3,795,632 A | 3/1974 | Morgan et al. |
| 4,003,851 A | 1/1977 | Ebel et al. |
| 4,009,096 A | 2/1977 | Pollitzer et al. |
| 4,226,742 A | 10/1980 | Bearden, Jr. et al. |
| 4,430,442 A | 2/1984 | Sawyer et al. |
| 4,508,847 A | 4/1985 | Chianelli et al. |
| 4,540,481 A | 9/1985 | Sawyer et al. |
| 4,542,121 A | 9/1985 | Mitchell, III et al. |
| 4,579,728 A | 4/1986 | Schoenthal et al. |
| 4,595,672 A | 6/1986 | Ho et al. |
| 4,637,870 A | 1/1987 | Bearden, Jr. et al. |
| 4,666,878 A | 5/1987 | Jacobson et al. |
| 4,719,002 A | 1/1988 | Mayer et al. |
| 4,721,558 A | 1/1988 | Jacobson et al. |
| 4,740,295 A | 4/1988 | Bearden, Jr. et al. |
| 4,765,882 A | 8/1988 | Aldridge et al. |
| 4,820,677 A | 4/1989 | Jacobson et al. |
| 4,826,797 A | 5/1989 | Chianelli et al. |
| 4,831,002 A | 5/1989 | Ho et al. |
| 4,836,912 A | 6/1989 | Schlosberg et al. |
| 4,976,848 A | 12/1990 | Johnson |
| 5,026,473 A | 6/1991 | Halbert et al. |
| 5,037,532 A | 8/1991 | Winter, Jr. et al. |
| 5,039,392 A | 8/1991 | Bearden, Jr. et al. |
| 5,053,376 A | 10/1991 | Bearden, Jr. et al. |
| 5,122,258 A | 6/1992 | Eadie et al. |
| 5,162,281 A | 11/1992 | Kamo et al. |
| 5,252,199 A | 10/1993 | Singhal et al. |
| 5,278,121 A | 1/1994 | Singhal et al. |
| 5,300,212 A | 4/1994 | Winter, Jr. |
| 5,384,336 A | 1/1995 | Koros |
| 5,397,456 A | 3/1995 | Dai et al. |
| 5,648,577 A | 7/1997 | Ho et al. |
| 5,695,632 A | 12/1997 | Brons et al. |
| 5,728,644 A | 3/1998 | Ho et al. |
| 5,767,037 A | 6/1998 | Ho et al. |
| 5,831,138 A | 11/1998 | Ho et al. |
| 5,840,264 A | 11/1998 | Pinnavaia et al. |
| 5,872,073 A * | 2/1999 | Hilsenbeck et al. .......... 502/220 |
| 5,900,384 A | 5/1999 | Soltani-Ahmadi et al. |
| 5,935,418 A | 8/1999 | Chakrabarty et al. |
| 5,935,421 A | 8/1999 | Brons et al. |
| 5,935,897 A | 8/1999 | Trubenbach et al. |
| 5,977,192 A | 11/1999 | Howsmon et al. |
| 6,030,915 A | 2/2000 | de Boer |
| 6,136,180 A | 10/2000 | Benazzi et al. |
| 6,156,695 A | 12/2000 | Soled et al. |
| 6,162,350 A | 12/2000 | Soled et al. |

(Continued)

FOREIGN PATENT DOCUMENTS

| | | |
|---|---|---|
| EP | 526988 | 6/1992 |
| EP | 1169414 | 10/2008 |
| EP | 2103347 | 9/2009 |
| WO | 2007070394 | 6/2007 |

OTHER PUBLICATIONS

Material Safety Data Sheet—Malic Acid. Date.

(Continued)

*Primary Examiner* — Elizabeth Wood

(57) ABSTRACT

The invention relates to a bulk multi-metallic catalyst for hydrotreating heavy oil feeds and to a method for preparing the catalyst. The bulk multi-metallic catalyst is prepared by sulfiding a catalyst precursor having a poorly crystalline structure with disordered stacking layers, with a type IV adsorption-desorption isotherms of nitrogen with a hysteresis starting point value of about 0.35, for a sulfided catalyst that will facilitate the reactant's and product's diffusion in catalytic applications. In another embodiment, the precursor is characterized as having a type H3 hysteresis loop. In a third embodiment, the hysteresis loop is characterized as having a well developed plateau above $P/P_o$ of about 0.55. The mesopores of the precursor can be adjustable or tunable.

20 Claims, 4 Drawing Sheets

U.S. PATENT DOCUMENTS

| | | | |
|---|---|---|---|
| 6,171,471 B1 | 1/2001 | Ferrughelli et al. |
| 6,299,760 B1 | 10/2001 | Soled et al. |
| 6,461,995 B1 | 10/2002 | Addiego et al. |
| 6,531,516 B2 | 3/2003 | Davis et al. |
| 6,534,437 B2 | 3/2003 | Eijsbouts et al. |
| 6,566,296 B2 | 5/2003 | Plantenga et al. |
| 6,620,313 B1 | 9/2003 | Demmin et al. |
| 6,635,599 B1 | 10/2003 | Eijsbouts et al. |
| 6,652,738 B2 | 11/2003 | Eijsbouts et al. |
| 6,712,955 B1 | 3/2004 | Hou et al. |
| 6,758,963 B1 | 7/2004 | Hantzer et al. |
| 6,783,663 B1 | 8/2004 | Riley et al. |
| 6,919,066 B2 | 7/2005 | Holzle et al. |
| 7,183,005 B2 | 2/2007 | Poloso et al. |
| 7,229,548 B2 | 6/2007 | Riley et al. |
| 7,232,515 B1 | 6/2007 | Demmin et al. |
| 7,288,182 B1 | 10/2007 | Soled et al. |
| 7,387,983 B2 | 6/2008 | Holzle et al. |
| 7,507,770 B2 | 3/2009 | Dogterom et al. |
| 2002/0010088 A1 | 1/2002 | Eijsbouts et al. |
| 2002/0045539 A1 | 4/2002 | Kasztelan |
| 2003/0102254 A1 | 6/2003 | Eijsbouts et al. |
| 2003/0150778 A1 | 8/2003 | Haluska et al. |
| 2004/0179996 A1 | 9/2004 | Shan et al. |
| 2004/0235653 A1 | 11/2004 | Domokos et al. |
| 2005/0040080 A1 | 2/2005 | Riley et al. |
| 2005/0250863 A1 | 11/2005 | Green et al. |
| 2006/0060502 A1 | 3/2006 | Soled et al. |
| 2006/0060503 A1 | 3/2006 | Soled et al. |
| 2006/0070915 A1 | 4/2006 | Euzen et al. |
| 2006/0157386 A1 | 7/2006 | Al-Naeem et al. |
| 2006/0207917 A1 | 9/2006 | Domokos et al. |
| 2007/0084754 A1 | 4/2007 | Soled et al. |
| 2007/0090023 A1 | 4/2007 | Soled et al. |
| 2007/0090024 A1 | 4/2007 | Soled et al. |
| 2008/0060977 A1 | 3/2008 | Bhan |
| 2008/0132407 A1 | 6/2008 | Bai et al. |
| 2008/0275286 A1 | 11/2008 | Xiao et al. |
| 2008/0306172 A1 | 12/2008 | Reynhout et al. |
| 2008/0308462 A1 | 12/2008 | Eijsbouts-Spickova et al. |
| 2009/0014356 A1 | 1/2009 | Eijsbouts-Spickova et al. |
| 2009/0057201 A1 | 3/2009 | Brait et al. |

OTHER PUBLICATIONS

Co-pending U.S. Appl. No. 12/259,412, filed Oct. 28, 2008.
Co-pending U.S. Appl. No. 12/259,424, filed Oct. 28, 2008.
Co-pending U.S. Appl. No. 12/259,435, filed Oct. 28, 2008.
Co-pending U.S. Appl. No. 12/259,442, filed Oct. 28, 2008.
Co-pending U.S. Appl. No. 12/259,451, filed Oct. 28, 2008.
Co-pending U.S. Appl. No. 12/259,467, filed Oct. 28, 2008.
Co-pending U.S. Appl. No. 12/259,495, filed Oct. 28, 2008.
Co-pending U.S. Appl. No. 12/259,507, filed Oct. 28, 2008.
Co-pending U.S. Appl. No. 12/259,529, filed Oct. 28, 2008.
Co-pending U.S. Appl. No. 12/432,719, filed Apr. 29, 2009.
Co-pending U.S. Appl. No. 12/432,721, filed Apr. 29, 2009.
Co-pending U.S. Appl. No. 12/432,723, filed Apr. 29, 2009.
Co-pending U.S. Appl. No. 12/432,727, filed Apr. 29, 2009.
Co-pending U.S. Appl. No. 12/432,728, filed Apr. 29, 2009.
Co-pending U.S. Appl. No. 12/432,730, filed Apr. 29, 2009.
PCT Search Report and Written Opinion for PCT/US08/81463 mailed Jan. 14, 2009.
PCT Search Report and written opinion related to PCT/US2010/032989 dated Dec. 28, 2010.
Catalysis Today 41 (1998) pp. 207-219 "Surface Area and Pore Structure of Catalysts" by Leofanti et al.
Energy & Fuels 2009, 23, pp. 1683-1694 "Atmospheric Residues of Kuwait Heavy Crude Upgrading: A Pilot Plant and Model Simulation Study" by Bahzad et al.
Chemical Engineering Science 62 (2007) pp. 463-470 Drying of wet agglomerates in a continuous fluid bed: Influence of Residence time, air temperature and air flow rate on the drying kinetics.
"Molecular Weight Distribution in Heavy Crudes" 1998 Paper authored by Boduszynski et al.
Energy & fuels pp. 1065-1071 "Estimation of Total Aromatic Content of Vacuum Gas Oil (VGO) Fractions (370-560° C.) by 1H NMR Spectroscopy" by Kapur et al, 2005.
Adsorption-Desorption Isotherm Studies of Catalysts, Ries et al., T he Sixclair Kefinlngc Company, Aug. 1945.
Hydrodesulfurization Activity of MoS2 and Bimetallic Catalysts Prepared by in Situ Decomposition of Thiosalt, Trakarnpruk et al., *Ind. Eng. Chem. Res.* 2007, 46, 1874-1882.
MgO-supported Mo, CoMo and NiMo sulfide hydrotreating catalysts, Zdražil, Catalysis Today 86 (2003) 151-171.
Cobalt—molybdenum sulfide catalysts prepared by in situ activation of bimetallic (Co—Mo) alkylthiomolybdates, Nava et al., Catalysis Letters vol. 86, No. 4, Mar. 2003.
Structured zeolites catalysts with hierarchical channel structure, Gu et al., www.rsc.org/chemcomm, Feb. 2010.
Pore structure of bulk tungsten carbide power catalysts, Lofberg et al., Catalysis Letters 33 (1995) 165-173.
Preparation of Cr2O3-promoted copper catalysts on rice husk ash by incipient wetness impregnation, Chang et al., Applied Catalysis A: General 288 (2005) 53-61.
Determination of effectiveness factor of a partial internal wetting catalyst from adsorption measurement, zhou et al., Chemical Engineering Science 59 (2004) 4305-4311.
Chemisorption of of Hydrogen Sulfide on Nickel and Ruthium Catalysts, Oliphant et al., Journal of Catalysis 51, 229-242 (1978).
Lower Closure Point of Adsorption Hysteresis in Ordered Mesoporous Silicas, Morishige et al., *Langmuir* 2007, 23, 11021-11026.
Physisorption hysteresis loops and the characterization of nanoporous materials, Sing et al., Adsorption Science & Technology (2004), 22(10), 773-782.

\* cited by examiner

HYDROCONVERSION MULTI-METALLIC CATALYST AND METHOD FOR MAKING THEREOF

CROSS-REFERENCE TO RELATED APPLICATIONS

This application is a continuation-in-part of application Ser. No. 12/432,728, filed Apr. 29, 2009 and now U.S. Pat. No. 7,964,526. This application is a continuation-in-part of application Ser. No. 12/432,723, filed Apr. 29, 2009 and now U.S. Pat. No. 7,931,799. This application is a continuation-in-part of application Ser. No. 12/432,730, filed Apr. 29, 2009 and now U.S. Pat. No. 8,080,492.

BACKGROUND

The invention relates generally to a hydroprocessing catalyst precursor, processes for preparing the catalyst precursor, multi-metallic catalysts prepared using the catalyst precursor, and hydroconversion processes employing the multi-metallic catalysts.

TECHNICAL FIELD

The petroleum industry is increasingly turning to heavy crudes, resids, coals and tar sands, i.e., lower grade hydrocarbon ("heavy oil"), as sources for feedstocks. The upgrading or refining of these feedstocks is accomplished by treating the feedstocks with hydrogen in the presence of catalysts to effect conversion of at least a portion of the feeds to lower molecular weight hydrocarbons, or to effect the removal of unwanted components, or compounds, or their conversion to innocuous or less undesirable compounds.

The pore structure of catalysts is usually formed in the crystallization stage or in subsequent treatment. Depending on their predominant pore size, the solid materials are classified according to size into three categories; micropores (dimension smaller than 3.5 nm), mesopores (dimension ranging from 3.5-500 nm) and macropores (dimension larger than 500 nm). The use of macroporous solids as adsorbents and catalysts is relatively limited due to their low surface area and large non-uniform pores. Microporous and mesoporous solids, however, are widely used in adsorption, separation technology and catalysis. Owing to the need for higher accessible surface area and pore volume for efficient chemical processes, there is a growing demand for new highly stable mesoporous catalysts. However, a catalyst that is highly porous does not necessarily mean that the catalyst has a lot of surface area. The catalyst may be too porous, having very little in terms of surface area and correspondingly, low catalytic activity in terms of reactive sites.

It is known in the prior art for the making of zeolites and supported sulfide catalysts with mesoporous structure for increased surface area. There is still a need for a bulk/unsupported catalyst for use in the hydroconversion of lower grade hydrocarbon with improved performance, i.e., providing high yield conversions with optimum porosity and surface area. There is also a need for a bulk multi-metallic catalyst having sufficient pore volume/size for hydrotreating heavy oil feeds.

SUMMARY

In one aspect, the invention relates to a stable bulk multi-metallic catalyst formed from a catalyst precursor having a Type IV isotherms with a H3-type hysteresis loop. In one embodiment, the mesopores are characterized as being tunable. In another embodiment, the catalyst precursor is characterized as having a poorly crystalline structure with disordered stacking layers, i.e., the stacking of the layers is highly random.

In another aspect, the invention relates to a method for making a stable bulk multi-metallic catalyst formed from a catalyst precursor having a Type IV isotherm with a H3-type hysteresis loop. The manufacturing method comprises: a) forming a precipitate comprising at least a promoter metal precursor, at least a Group VIB metal precursor, optionally a ligating agent, and optionally at least a diluent, wherein the promoter metal precursor is selected from Group VIII, Group IIB, Group IIA, Group IVA and combinations thereof; b) removing at least 50% of liquid from the precipitate forming a filter cake; c) adding to the filter cake at least one of a shaping aid agent, a pore forming agent, a peptizing agent, a diluent, and combinations thereof, forming a batch mixture; d) shaping the batch mixture into a shaped catalyst precursor via any of pelletizing, extrusion, tableting, molding, tumbling, pressing, spraying and spray drying; and b) sulfiding the shaped catalyst precursor forming a bulk multi-metallic catalyst. In one embodiment, the amount of ligating agent is controlled to vary or tune the mesopores of the catalyst precursor. In another embodiment, the additives to the shaping step are varied and controlled to tune the mesopores of the catalyst precursor.

DETAILED DESCRIPTION

Figure 1:
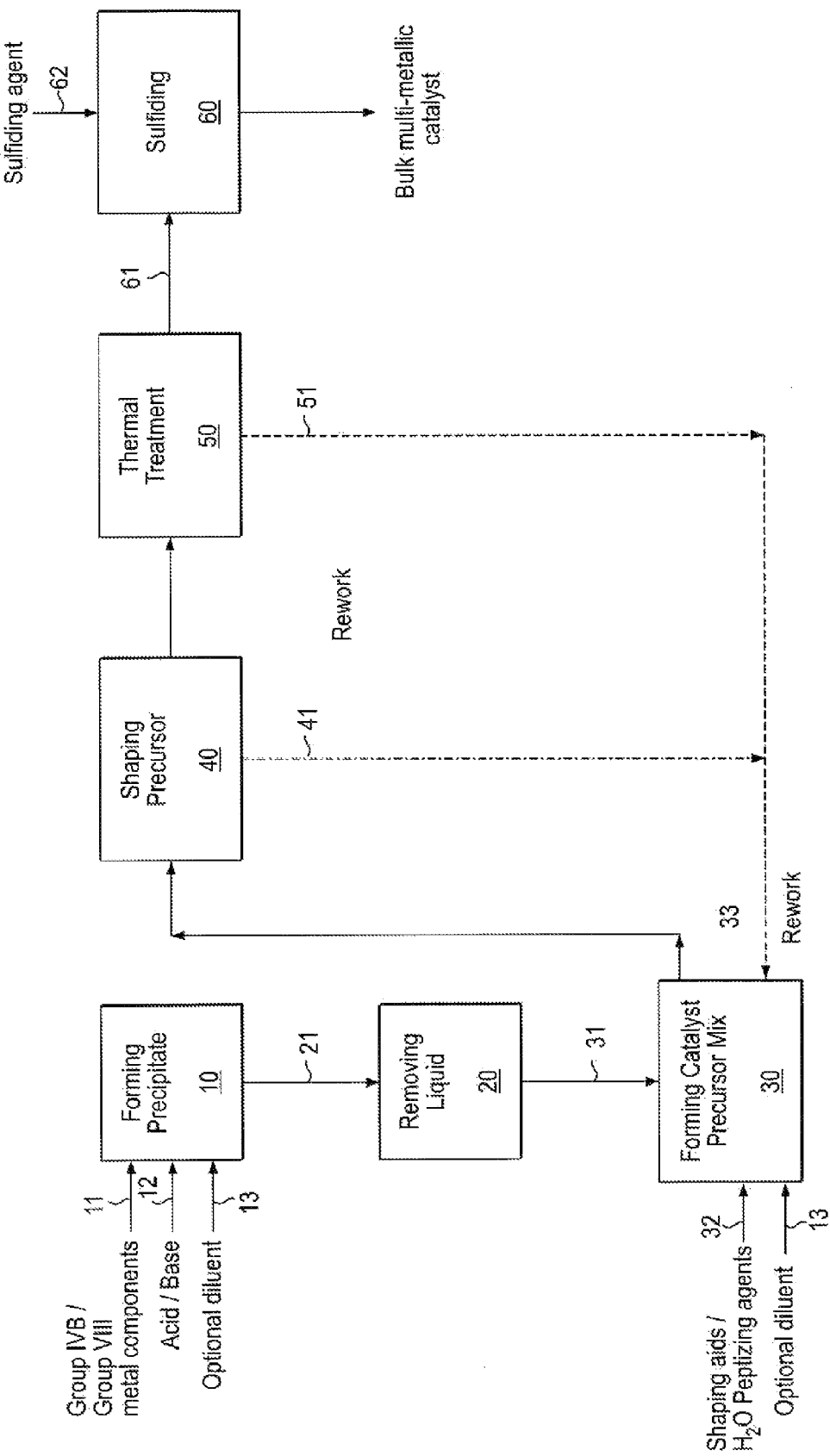
FIG. 1 is block diagram showing an embodiment of a process for making a multi-metallic catalyst from a mesoporous catalyst precursor having a Type IV isotherm with a H3-type hysteresis loop.

The following terms will be used throughout the specification and will have the following meanings unless otherwise indicated.

SCF/BBL (or scf/bbl, or scfb or SCFB) refers to a unit of standard cubic foot of gas ($N_2$, $H_2$, etc.) per barrel of hydrocarbon feed.

LHSV means liquid hourly space velocity.

The Periodic Table referred to herein is the Table approved by IUPAC and the U.S. National Bureau of Standards, an example is the Periodic Table of the Elements by Los Alamos National Laboratory's Chemistry Division of October 2001.

As used here, the term "bulk catalyst" may be used interchangeably with "unsupported catalyst," meaning that the catalyst composition is NOT of the conventional catalyst form which has a preformed, shaped catalyst support which is then loaded with metals via impregnation or deposition catalyst. In one embodiment, the bulk catalyst is formed through precipitation. In another embodiment, the bulk catalyst has a binder incorporated into the catalyst composition. In yet another embodiment, the bulk catalyst is formed from metal compounds and without any binder.

As used herein, the phrases "one or more of" or "at least one of" when used to preface several elements or classes of elements such as X, Y and Z or $X_1$—$X_n$, $Y_1$—$Y_n$ and $Z_1$—$Z_n$, is intended to refer to a single element selected from X or Y or Z, a combination of elements selected from the same common class (such as $X_1$ and $X_2$), as well as a combination of elements selected from different classes (such as $X_1$, $Y_2$ and Zn).

As used herein, "hydroconversion" or "hydroprocessing" is meant any process that is carried out in the presence of hydrogen, including, but not limited to, methanation, water gas shift reactions, hydrogenation, hydrotreating, hydrodesulphurization, hydrodenitrogenation, hydrodemetallation, hydrodearomatization, hydroisomerization, hydrodewaxing and hydrocracking including selective hydrocracking. Depending on the type of hydroprocessing and the reaction conditions, the products of hydroprocessing can show improved viscosities, viscosity indices, saturates content, low temperature properties, volatilities and depolarization, etc.

As used herein, 700° F.+conversion rate refers to the conversion of an oil feedstock having a boiling point of greater than 700° F.+ to less than 700° F. (371° C.) boiling point materials in a hydroconversion process, computed as (100%* (wt. % boiling above 700° F. materials in feed–wt. % boiling above 700° F. materials in products)/wt. % boiling above 700° F. materials in feed)).

As used herein, "LD50" is the amount of a material, given all at once, causes the death of 50% (one half) of a group of test animals. LD-50 measures the short-term poisoning potential (acute toxicity) of a material with the testing being done with smaller animals such as rats and mice (in mg/Kg).

As used herein, "shaped catalyst precursor" means catalyst precursor formed (or shaped) by spray drying, pelleting, pilling, granulating, beading, tablet pressing, bricketting, using compression method via extrusion or other means known in the art or by the agglomeration of wet mixtures. The shaped catalyst precursor can be in any form or shape, including but not limited to pellets, cylinders, straight or rifled (twisted) trilobes, multiholed cylinders, tablets, rings, cubes, honeycombs, stars, tri-lobes, quadra-lobes, pills, granules, etc.

Pore porosity and pore size distribution in one embodiment can be measured using mercury intrusion porosimetry, designed as ASTM standard method D 4284. In another embodiment, pore porosity and size distribution are measured via the nitrogen adsorption method.

Layered or textural porosity is the porosity that can be attributed to voids between layers or platters of catalyst precursors. One skilled in the art of transmission electron spectroscopy (TEM) can determine the existence of layers or platters of catalyst precursors from high resolution TEM images. One skilled in the art of adsorption can distinguish and evaluate the layered porosity by the specific adsorption behavior of the catalyst precursor. One way to detect and assess layered or textural mesoporosity is evidenced by the presence of a type IV adsorption-desorption isotherm exhibiting well-defined hysteresis loop in the region of relative pressure $P/P_o$>0.40 (Sing et al., *Pure Appl. Chem.*, vol. 57, 603-619 (1985)).

The bulk catalyst of the present invention is made from a randomly stacking layered or textural mesoporous catalyst precursor, i.e., a poorly crystalline structured catalyst precursor exhibiting type IV isotherms. In one embodiment, the catalyst precursor for forming the bulk catalyst is characterized as having a H3-type hysteresis loop.

Catalyst Product: The catalyst precursor with a type IV adsorption-desorption isotherm is converted into a catalyst (becoming catalytically active) upon sulfidation, for subsequent use in hydrodesulfurization (HDS), hydrodearomatization (HDA), and hydrodenitrification (HDN) processes. The catalyst precursor can be a hydroxide or oxide material, prepared from at least a Promoter metal precursor and at least a Group VIB metal precursor.

In one embodiment, the catalyst precursor in the form of a bulk multi-metallic oxide comprising of at least one Group VIII non-noble material and at least two Group VIB metals. In one embodiment, the ratio of Group VIB metal to Group VIII non-noble metal ranges from about 10:1 to about 1:10. In another embodiment, the oxide catalyst precursor is of the general formula: $(X)_b(Mo)_c(W)_dO_z$; wherein X is Ni or Co, the molar ratio of b:(c+d) is 0.5/1 to 3/1, the molar ratio of c:d is >0.01/1, and z=[2b+6 (c+d)]/2. In one embodiment, the oxide catalyst precursor further comprises one or more ligating agents L.

The term "ligand" may be used interchangeably with "ligating agent," "chelating agent" or "complexing agent" (or chelator, or chelant), referring to an additive that combines with metal ions, e.g., Group VIB and/or Promoter metals, forming a larger complex, e.g., a catalyst precursor, and facilitating the tuning or adjustment of the porosity of the mesopores.

In one, the catalyst precursor is in the form of a hydroxide comprising of at least one Group VIII non-noble material and at least two Group VIB metals. In another embodiment, the hydroxide compound is of the general formula $A_v[(M^P)(OH)_x(L)^n_y]_z(M^{VIB}O_4)$, wherein A is one or more monovalent cationic species, M refers to at least a metal in their elemental or compound form, and L refers to one or more ligating agents.

In one embodiment, the catalyst precursor is prepared from a process with the inclusion of at least a diluent, for the precursor to have the formula $A_r[(M^{IIA})_s(M^{VIII})_t(Al)_u(OH)_v(L)_w]_x(Si_{1-y}Al_yO_2)_z(M^{VIB}O_4)$, wherein A is one or more monovalent cationic species, $M^{IIA}$ is one or more group IIA metals, $M^{VIII}$ is one or more Group VIII metals, Al is aluminum, L is one or more ligating agents, $(Si_{(1-y)}Al_yO_2)$ is a silica-alumina moiety, $M^{VIB}$ is one or more Group VIB metals with the atomic ratio of $M^{VII}:M^{VIB}$ between 100:1 and 1:100. In one embodiment, A is at least one of an alkali metal cation, an ammonium, an organic ammonium and a phosphonium cation. In one embodiment, A is selected from monovalent cations such as NH4+, other quaternary ammonium ions, organic phosphonium cations, alkali metal cations, and combinations thereof.

In one embodiment, L is one or more optional ligating agents. In another embodiment, L is charge neutral or has a negative charge n<=0. In another embodiment, L is a non-toxic organic oxygen containing ligating agent with an LD50 rate (as single oral dose to rats) of greater than 500 mg/Kg. The term "charge-neutral" refers to the fact that the catalyst precursor carries no net positive or negative charge. Examples include but are not limited to polydentate as well as monodentate, e.g., $NH_3$ as well as alkyl and aryl amines; carboxylates, carboxylic acids, aldehydes, ketones, the enolate forms of aldehydes, the enolate forms of ketones and hemiacetals; organic acid addition salts such as formic acid, acetic acid, propionic acid, maleic acid, malic acid, cluconic acid, fumaric acid, succinic acid, tartaric acid, citric acid, oxalic acid, glyoxylic acid, aspartic acid, alkane sulfonic acids, aryl sulfonic acids; arylcarboxylic acids; carboxylate containing compounds; and combinations thereof.

$M^P$ is at least a promoter metal. In one embodiment, $M^P$ has an oxidation state of either +2 or +4 depending on the Promoter metal(s) being employed. $M^P$ is selected from Group VIII, Group IIB, Group IIA, Group IVA and combinations thereof. In one embodiment, $M^P$ is at least a Group VIII metal and $M^P$ has an oxidation state P of +2. In another embodiment, $M^P$ is selected from Group IIB, Group IVA and combinations thereof. In one embodiment, the Promoter metal $M^P$ is at least a Group VIII metal with $M^P$ having an oxidation state of +2 and the catalyst precursor is of the formula $A_v[(M^P)(OH)_x(L)^n{}_y]_z(M^{VIB}O_4)$ to have (v−2+2 z−x*z+n*y*z)=0. In one embodiment, the Promoter metal $M^P$ is a mixture of two Group VIII metals such as Ni and Co. In yet another embodiment, $M^P$ is a combination of three metals such as Ni, Co and Fe. In one embodiment where $M^P$ is a mixture of two group IIB metals such as Zn and Cd, the catalyst precursor is of the formula $A_v[(Zn_aCd_{a'})(OH)_x(L)_y]_z(M^{VIB}O^4)$. In yet another embodiment, $M^P$ is a combination of three metals such as Zn, Cd and Hg, and the catalyst precursor is of the formula $A_v[(Zn_aCd_aHg_{a''})(OH)_x(L)_{n\ y}]_z(M^{VIB}O^4)$.

In one embodiment, the Promoter metal $M^P$ is selected from the group of IIB and VIA metals such as zinc, cadmium, mercury, germanium, tin or lead, and combinations thereof, in their elemental, compound, or ionic form. In yet another embodiment, the Promoter metal $M^P$ further comprises at least one of Ni, Co, Fe and combinations thereof, in their elemental, compound, or ionic form. In another embodiment, the Promoter metal is a Group IIA metal compound, selected from the group of magnesium, calcium, strontium and barium compounds which are at least partly in the solid state, e.g., a water-insoluble compound such as a carbonate, hydroxide, fumarate, phosphate, phosphite, sulphide, molybdate, tungstate, oxide, or mixtures thereof.

In one embodiment, $M^{VIB}$ is at least a Group VIB metal having an oxidation state of +6. In one embodiment, $M^P$:$M^{VIB}$ has an atomic ratio between 100:1 and 1:100. v−2+P*z−x*z+n*y*z=0; and $0 \leq y \leq -P/n$; $0 \leq x \leq P$; $0 \leq v \leq 2$; $0 \leq z$. In one embodiment, $M^{VIB}$ is molybdenum. In yet another embodiment, $M^{VIB}$ is a mixture of at least two Group VIB metals, e.g., molybdenum and tungsten.

Methods for Making Catalyst: Reference will be made to FIG. 1, which is a block diagram schematically illustrating an embodiment of a general process for making the bulk catalyst out of a catalyst precursor exhibiting type IV adsorption isotherms.

Forming a Precipitate or Cogel: The first step 10 in the process is a precipitation or cogellation step, which involves reacting in a mixture of the metal precursors 11, e.g., Promoter metal component(s) and the Group VIB metal component to obtain a precipitate or cogel. The term "cogel" refers to a co-precipitate (or precipitate) of at least two metal compounds. The metal precursors can be added to the reaction mixture as a solid, in solution, suspension, or a combination thereof. If soluble salts are added as such, they will dissolve in the reaction mixture and subsequently be precipitated or cogelled, or forming a suspension. The solution can be heated optionally under vacuum to effect precipitation and evaporation of the liquid.

The precipitation (or cogelation) is carried out at a temperature and pH under which the Promoter metal compound and the Group VIB metal compound precipitate or form a cogel. In one embodiment, the temperature at which the cogel is formed is between 25-350° C. In one embodiment, the catalyst precursor is formed at a pressure between 0 to 3000 psig. In a second embodiment, between 10 to 1000 psig. In a third embodiment, between 30 to 100 psig. The pH of the mixture can be changed to increase or decrease the rate of precipitation or cogelation depending on the desired characteristics of the product. In one embodiment, the mixture is left at its natural pH during the reaction step(s). In another embodiment, the pH is maintained in the range of 0-12. In another embodiment, the pH is maintained in the range of 7-10. Changing the pH can be done by adding base or acid 12 to the reaction mixture, or adding compounds, which decompose upon temperature increase into hydroxide ions or H' ions that respectively increase or decrease the pH. In another embodiment, adding compounds which participate in the hydrolysis reaction.

In one embodiment, at least a ligating agent L can be optionally added as one of the reagents forming the precipitate (prior to the precipitation or cogelation of the promoter metal compounds and/or Group VIB metal compounds). In another embodiment, the litigating agent L is added after the precipitate is formed (as shown in step 25 of FIG. 1). In one embodiment, the ligating agent L added after the precipitation step is different from the ligating agent added prior to the precipitation step.

It should be noted that the mesoporosity of the catalyst precursor can be controlled or tuned with the selection of the ligating agent and/or the amount added. In one embodiment, it is observed that the incorporation of the ligating agent L significantly increases the porosity of the catalyst precursor.

In one embodiment, instead of or in addition to the ligating agent L, diluent amounts from 5-95 wt. % of the total composition of the catalyst precursor can also be added to this step, depending on the envisaged catalytic application. These materials can be applied before or after the precipitation or cogelation of the metal precursors. Examples include but are not limited to zinc oxide; zinc sulfide; niobia; tetraethyl orthosilicate; silicic acid; titania; silicon components such as sodium silicate, potassium silicate, silica gels, silica sols, silica gels, hydronium- or ammonium-stabilized silica sols, and combinations thereof; aluminum components useful in the process of the present invention include, but are not limited to, sodium aluminate, potassium aluminate, aluminum sulfate, aluminum nitrate, and combinations thereof; magnesium components such as magnesium aluminosilicate clay, magnesium metal, magnesium hydroxide, magnesium halides, magnesium sulfate, and magnesium nitrate; zirconia; cationic clays or anionic clays such as saponite, bentonite, kaoline, sepiolite or hydrotalcite, or mixtures thereof. In one embodiment, titania is used as a diluent in an amount of greater than 50 wt. %, on a final catalyst precursor basis (as an oxide or hydroxide).

Liquid Removal: In the next step 20, at least 50 wt. % of liquid (supernatant/water) is removed from the precipitate (or suspension) via separation processes known in the art, e.g., filtering, decanting, centrifuging, etc. In one embodiment, liquid in the precipitate is removed via filtration with vacuum techniques or equipment known in the art, giving a wet filter cake. A wet filter cake is generally defined as filter cake having approximately 10 to 50 wt. % liquid, thus being generally free of water or other solvent such as methanol and the like.

In one embodiment, optional drying of the filter cake is performed under atmospheric conditions or under an inert atmosphere such as nitrogen, argon, or vacuum, and at a temperature sufficient to remove water but not removal of organic compounds. In one embodiment, the drying is performed at about 50 to 120° C. until a constant weight of the catalyst precursor is reached. In another embodiment, the drying is done at a temperature between 50° C. to 200° C. for a period ranging from ½ hour to 6 hours. Drying can be done via thermal drying techniques known in the art, e.g., flash drying, belt drying, oven drying, etc.

Forming Catalyst Precursor Mix For Shaping: In this step 30, the filter cake is mixed together with water and other optional materials including but not limited to shaping aids 32, peptizing agents, pore forming agents, and diluent materials 13. In one embodiment, rework material in the form of filter cake material, extrudable dough and/or dry particles/pieces of precursor materials from previous runs can be optionally included the materials to form a new batch of catalyst precursor mix. In one embodiment, the amount of water and/or the amount of/type of optional materials is varied to control and/or tune the mesoporosity of the catalyst precursor formed. In one embodiment, the addition of water helps increase the surface area of the catalyst precursor.

The precursor batch mixture is mixed for a sufficient period of time to obtain a mixture that is substantially uniform or homogeneous. The mixing time depends on the type and efficiency of the mixing technique, e.g., milling, kneading, slurry mixing, dry or wet mixing, or combinations thereof and the mixing apparatus used, e.g., a pug mill, a blender, a double-arm kneading mixer, a rotor stator mixer, or a mix muller. In one embodiment, the mixing time ranges from 0.1 to 10 hours. In one embodiment, a shaping aid agent is added in a ratio of between 100:1 and 10:1 (wt. % catalyst precursor to wt. % shaping aid). Examples of shaping aid agents include but are not limited to organic binders of the cellulose ether type and/or derivatives, polyakylene glycols, saturated or unsaturated fatty acid (such as politic acid, satiric acid or oleic acid) or a salt thereof, a polysaccharide derived acid or a salt thereof, graphite, starch, alkali stearate, ammonium stearate, stearic acid, mineral oils, and combinations thereof.

In one embodiment, a peptizing agent may be added to the mixture. The peptizing agent may be an alkali or an acid, e.g., ammonia, formic acid, citric acid, nitric acid, maleic acid, carboxylic acid, etc. In another embodiment, a pore forming agent is also added to the mixture along with the rework. Examples of pore forming agents include but are not limited to mineral oils, steric acid, polyethylene glycol polymers, carbohydrate polymers, methacrylates, cellulose polymers, and carboxylates which decompose upon being heated. In yet another embodiment, diluent materials can be added. The diluent materials added in this step can be the same as or different from any diluent materials that may have been added to the step of forming the precipitate from metal precursors above.

In one embodiment wherein the catalyst precursor is to be shaped via pelletizing, extrusion, or pressing, a sufficient amount of water is added to the mixing batch to adjust the batch viscosity to a convenient level for plasticizing and shaping, i.e., a mixture of dough consistency. In one embodiment, a sufficient amount of water is added for the mixture to have between 50 to 90% solids (LOI). In another embodiment, between 60 to 70% solids (LOI).

Shaping Process: In this step 40, the catalyst precursor mix is shaped into formed particles, such as spheroids, pills, tablets, cylinders, irregular extrusions, merely loosely bound aggregates or clusters, etc., using any of the methods known in the art including pelletizing, extrusion, tableting, molding, tumbling, pressing, spraying and spray drying.

In one embodiment, a shaped catalyst precursor is formed via extrusion, using extrusion equipment known in the art, e.g., single screw extruder, ram extruder, twin-screw extruder, etc. In another embodiment, the shaping is done via spray drying at an outlet temperature ranging from 100° C. to 320° C. In one embodiment, shaped catalyst precursor is extruded into extrudate having a diameter from about 1/16 to 1/8 of an inch. After extrusion the extrudate can be cut to suitable lengths, e.g., 1/16-inch to 5/16-inch, to produce cylindrical pellets.

Thermal Treatment: In one embodiment, the shaped catalyst precursor undergoes a thermal treatment step 50. In one embodiment, the catalyst precursor is air (or nitrogen) dried in a directly or indirectly heated oven, tray drier, or belt drier at about 50° C. to 325° C. for about 15 minutes to 24 hours, and wherein the temperature is room temperature to drying temperature at a rate of 1-50° C. per minute. In one embodiment, the temperature is ramped up at a slow rate of 1-2° C. per minute. In a second embodiment, air drying is performed at a fast ramp up rate of at least 25° C. per minute. In one embodiment, the drying is at a temperature at or below 100° C.

Generally, it is known that the higher temperature of the heat treatment, the higher the densities of the catalyst precursor and therefore, upon sulfidation, resulting in a catalyst that also has a low shrinkage rate. In some embodiments, low (less than 10%) volumetric shrinkage is obtained with the thermal treatment at a low temperature, e.g., less than 325° C., less than 200° C., and even at a temperature at or below 100° C.

In one embodiment, after an optional thermal treatment, the shaped catalyst can be optionally calcined at a temperature in the range of about 350° C. to 750° C. in a suitable atmosphere, e.g., inerts such as nitrogen or argon, or steam. In yet another embodiment, the calcination is carried out at a temperature between 350° C. to 600° C. In the calcination process, the catalyst precursor gets converted into an oxide. In one embodiment, the oxide catalyst precursor is of the general formula: $(X)_b(Mo)_c(W)_dO_z$; wherein X is Ni or Co, the molar ratio of b:(c+d) is 0.5/1 to 3/1, the molar ratio of c:d is >0.01/1, and $z=[2b+6\,(c+d)]/2$.

In one embodiment, the catalyst precursor is nitrogen stable. As used herein, the term nitrogen stable means that the properties (after the catalyst precursor is sulfided to form a catalyst) are not affected by the drying agent, i.e., whether drying in a nitrogen or oxygen environment.

Sulfiding Step: The shaped catalyst precursor (with optional rework materials) can be sulfided in a sulfiding step 60 to form an active catalyst, with the use of at least a sulfiding agent 62 selected from the group of: elemental sulfur by itself; a sulfur-containing compound which under prevailing conditions, is decomposable into hydrogen sulphide; $H_2S$ by itself or $H_2S$ in any inert or reducing environment, e.g., $H_2$. Examples of sulfiding agents include ammonium sulfide, ammonium polysulfide ($[(NH_4)_2S_x]$), ammonium thiosulfate ($(NH_4)_2S_2O_3$), sodium thiosulfate ($Na_2S_2O_3$), thiourea $CSN_2H_4$, carbon disulfide, dimethyl disulfide (DMDS), dimethyl sulfide (DMS), dibutyl polysulfide (DBPS), mercaptanes, tertiarybutyl polysulfide (PSTB), tertiarynonyl polysulfide (PSTN), and the like. In one embodiment, hydrocarbon feedstock is used as a sulfur source for performing the sulfidation of the catalyst precursor.

In the sulfiding step, shaped catalyst precursor is converted into an active catalyst upon contact with the sulfiding agent at a temperature ranging from 25° C. to 500° C., from 10 minutes to 15 days, and under a $H_2$-containing gas pressure. The total pressure during the sulfidation step can range between atmospheric to about 10 bar (1 MPa). If the sulfidation temperature is below the boiling point of the sulfiding agent, the process is generally carried out at atmospheric pressure. Above the boiling temperature of the sulfiding agent/optional components (if any), the reaction is generally carried out at an increased pressure.

Use of the Catalyst: As catalyst precursors sometimes can be sulfided in-situ, e.g., in the same hydrotreating reactors during hydrotreatment, catalyst performance can be characterized by the properties of the catalyst precursors before sulfidation.

In one embodiment, the catalyst precursor for preparing the bulk catalyst is characterized as having a poorly crystalline structure with disordered stacking layers, with a type IV adsorption-desorption isotherms of nitrogen. The point at which the relative pressure $P/P_o$ of $N_2$ adsorption and desorption isotherms begins to diverse defines the adsorption capacity of the sulfided catalyst product. The $N_2$ adsorption desorption isotherms of the catalyst precursor of the invention forms a close hysteresis cycle which enclosed area is proportional to the specific volume of the mesopores. The lower the $P/P_o$ is, the larger the area enclosed by the hysteresis cycle and consequently the greater the adsorption capacity. $P_o$ is the $N_2$ saturation pressure. In one embodiment, the catalyst precursor has a $P/P_o$ hysteresis starting point value of about 0.35.

In one embodiment, the precursor is characterized as having a type H3 hysteresis loop. In one embodiment, the hysteresis loop is characterized as having a well developed plateau above $P/P_o$ of about 0.55.

The precursor is also characterized as having a mesoporous structure with an average pore size (width) ranging from 2 nm to 200 nm in one embodiment; from 5 to 150 nm in a second embodiment, from 10 nm to 125 nm in another embodiment, and from 15 nm to 100 nm in a fourth embodiment. The pore volume in one embodiment is more than 0.01 $cm^3/g$. In yet another embodiment, the pore volume ranges from 0.01 to 0.50 $cm^3/g$. In a third embodiment ranging from 0.02 to 0.20 $cm^3/g$, and in a fourth embodiment ranging from 0.05 to 0.15 $cm^3/g$. The surface area measured by the BET method, using nitrogen as adsorbate, ranges from 25 to 400 $m^2/g$ in one embodiment; from 40 to 200 $m^2/g$ in a second embodiment; and from 60 to 150 $m^2/g$ in a third embodiment.

As the catalyst precursor and the sulfided bulk metallic catalyst formed therefrom have sufficient mesopore sites and large pore volume to overcome the diffusion limitations of heavy petroleum feeds, the bulk metallic catalyst in one embodiment is particularly suitable for hydrotreating heavy petroleum feeds having an atmospheric residue (AR) boiling point in the range of 343° C. (650° F.)-to 454° C. (850° F.) and particularly above 371° C. (700° F.). Heavy oil feeds having a boiling point greater than 343° C. (650° F.) are commonly characterized as having relatively high specific gravity, low hydrogen-to-carbon ratios, and high carbon residue. They contain large amounts of asphaltenes, sulfur, nitrogen and metals, which increase hydrotreating difficulty with their large molecular diameter.

In one embodiment, the bulk catalyst formed from the precursor with disordered stacking layers and a type IV adsorption-desorption isotherms is characterized as being very stable. A catalyst's stability can be evaluated based on the residual geometric volume shrinkage of the catalyst precursor, measured as the change in the geometric volume of the shaped catalyst precursor before and after it is sulfided. The volumetric shrinkage measured after the sulfidation step can be used as an indication of a catalyst's mechanical integrity under severe hydroprocessing conditions, as precursors are often sulfided in-situ in the same reactor as the hydroprocessing reactor. In one embodiment, the catalyst precursor with a type IV adsorption-desorption isotherms is characterized as having a residual geometric volume shrinkage of less than about 12% upon exposure to a temperature of at least 100° C. for at least 30 minutes in a sulfiding step. In a second embodiment, the volume shrinkage is less than about 10%. In a third embodiment, the volume shrinkage is less than about 8%. In a fourth embodiment, less than 5%.

In one embodiment, the bulk catalyst is particularly suited for hydrotreating heavy petroleum feeds having an average molecular diameter ranging from 0.9 nm to 1.7 nm (9 to 17 angstrom), providing an HDN conversion level of >99.99% (700° F.+conversion), lowering the sulfur level in fraction above 700° F. boiling point to less than 20 ppm in one embodiment, and less than 10 ppm in a second embodiment. In one embodiment, the bulk catalyst is particularly suited for hydrotreating a heavy petroleum feed having an average molecular diameter ranging from 0.9 nm to 1.7 nm. In yet another embodiment, the bulk catalyst is particularly suitable for treating a heavy oil feed having an average molecular weight Mn ranging from 300 to 400 g/mole.

In one embodiment, the precursor for forming the catalyst also exhibits other desirable properties, including a compact bulk density (CBD) of at most 1.6 g/cc; a crush strength of at least about 4 lbs; and an attrition loss of less than 7 wt. %. Attrition loss is the loss to fine amount measured when tumbled one-half hour in a rotating drum. In another embodiment, the attrition loss is less than 5 wt. %. In a third embodiment, the CBD is at most 1.4 g/cc. In a fourth embodiment, the CBD is at most 1.2 g/cc. In a fifth embodiment, a CBD in the range of 1.2 g/cc to 1.4 g/cc. In one embodiment, the crush strength is at least 6 lbs. In one embodiment, the catalyst precursor has a particle density of equal or less 2.5 g/cc. In another embodiment, the particle density is equal or less than 2.2 g/cc.

The bulk multi-metallic catalyst can be used in virtually all hydroprocessing processes to treat a plurality of feeds under wide-ranging reaction conditions such as temperatures of from 200 to 450° C., hydrogen pressures of from 15 to 300 bar, liquid hourly space velocities of from 0.05 to 10 $h^{-1}$ and hydrogen treat gas rates of from 35.6 to 2670 $m^3/m^3$ (200 to 15000 SCF/B—or "Standard Cubic Feet per Barrel" of hydrocarbon compound feed to the reactor). The catalyst is also characterized by excellent catalytic activity, as giving an almost full HDN conversion rate (>99.99%) in the hydrotreating of heavy oil feedstock such as VGO.

EXAMPLES

The following illustrative examples are intended to be non-limiting. In the examples, the pore structure was characterized by measuring the N2 adsorption desorption isotherms using standard continuous sorption procedures. The specific surface area and the total pore volume can be calculated from the isotherms following IUPAC recommendations. The volume of pores corresponding to the textural mesopores can be evaluated from the upper inflection point of the low $P/P_o$ hysteresis loop.

Example 1

Ni—Mo—W-maleate Catalyst Precursor

A catalyst precursor of the formula $(NH_4)\{[Ni_{2.6}(OH)_{2.08}(C_4H_2O_4^{2-})_{0.06}](Mo_{0.35}W_{0.65}O_4)_2\}$ was prepared as follows: 954.8 g of ammonium heptamolybdate $(NH_4)_6Mo_7O_{24}.4H_2O$ was dissolved in 4.8 L of deionized water at room temperature. The pH of the resulting solution was within the range of 2-3. 1334 g of ammonium metatungstate $(NH_4)_6H_2W_{12}O_{40}.4.7H_2O$ was dissolved in 1.3 L water. The molybdate and tungstate solutions were added to 34.9 L deionized water. To this mixed molybdate and tungstate solution 2.03 L of a 7.0 wt-% $NH_4OH$ (ammonia) solution was added, and the temperature was increased to 77 C with constant stirring. The solution had a pH in the range of 8-10. A second solution was prepared containing 3149 g of Ni(NO$_3$)$_2$.6H$_2$O dissolved in 2.7 L deionized water. To this nickel solution were added 1.2 L of 28 wt-% NH4OH solution followed by a solution of 108 g maleic acid in 0.25 L deionized water. The nickel solution was then added in 10 minutes to the molybdate/tungstate solution while maintaining the temperature at 77 C. The resulting mixture was kept at 77° C. and stirring continued for an hour. The pH of the suspension was in the range of 6-7. After addition of 0.72 L of a 7.0 wt-% NH4OH solution, and cooling to 60 C a blue-green precipitate was collected by filtration and dried by pressing it at 150 psi in a filter press. The collected and pressed precipitate was aged in a sealed container at 50 C for 15 hours. After ageing the precipitate was mixed with 4 wt-% Methocel, and dried at 50 C until it exhibited a Loss On Ignition (LOI) of 45 wt-% and a carver of 1500 psi, and extruded in a Wolf screw extruder with NAQ dies.

Figure 2:
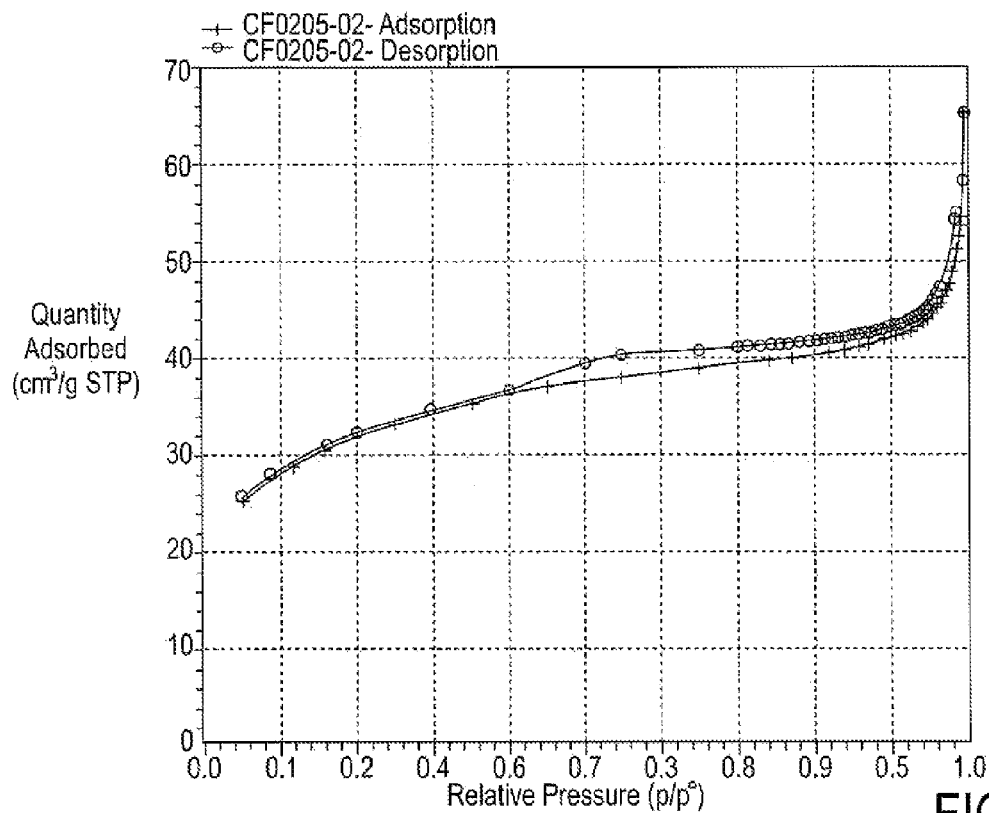
FIG. 2 is a graph illustrating the N2 adsorption (+) and desorption (-o-) isotherms of one embodiment of the catalyst precursor.
Figure 3:
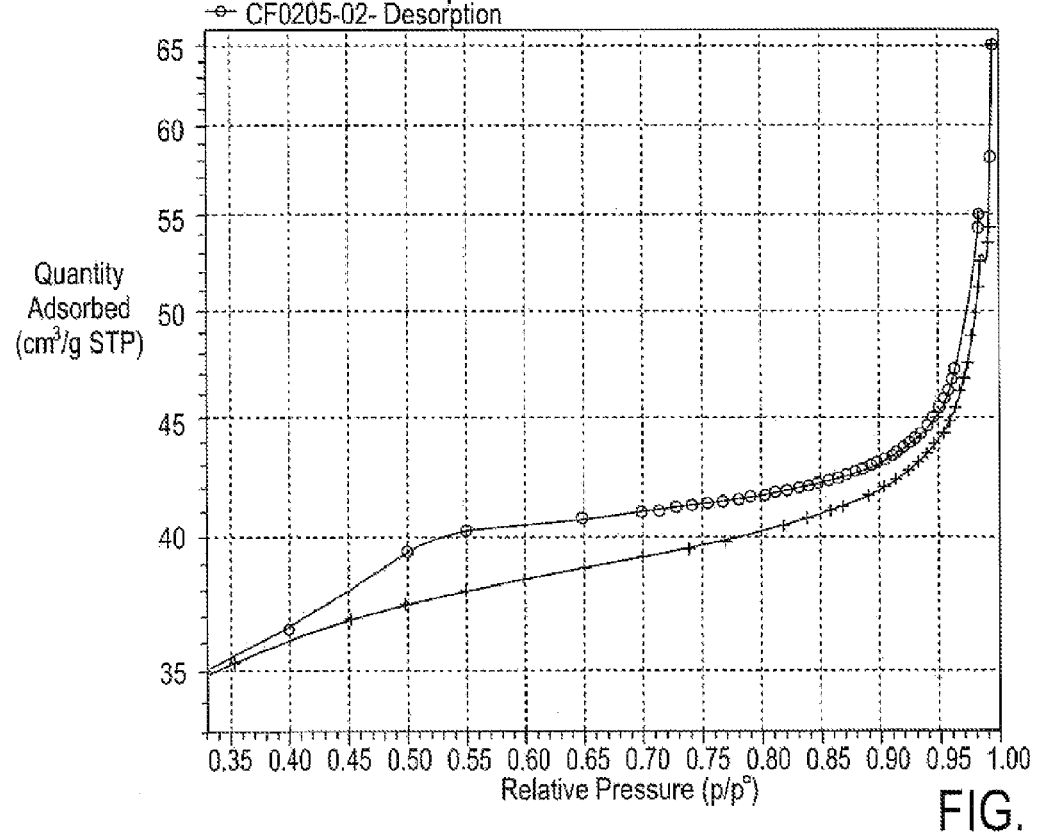
FIG. 3 is a graph illustrating the N2 adsorption (+) and desorption (-o-) isotherms of the catalyst precursor of FIG. 2 in the relative pressure range of 0.35 to 1.00.

The N2 adsorption desorption isotherm of the precursor is shown in FIGS. 2-3, composed of a well defined hysteresis loop corresponding to the presence of mesoporosity. Other pore characteristics of the precursor include: Sample density of 1 g/$^c$m$^3$. Surface area characteristics including single point surface area at P$'$/P$°$=0.20 of 110.4051 m$^2$/g; BET surface area of 112.5688 m$^2$/g; BJH (Barret-Joyner-Halenda) adsorption cumulative surface area of pores between 17 and 3000 angstrom width of 73.137 m$^2$/g; BJH desorption of 75.886 m$^2$/g. Pore volume characteristics include single point desorption total pore volume of pores less than 2278 angstrom at P$'$/P$°$=0.99 of 0.089960 $^c$m$^3$/g; BJH adsorption cumulative surface area of pores between 17 and 3000 angstrom width of 0.068115 $^c$m$^3$/g; and BJH desorption of 0.074654 $^c$m$^3$/g. Pore size characteristics including desorption average pore width (4 V/A by BET) of 31.9662 angstrom; BJH adsorption average pore width of 37.254 angstrom; and BJH desorption average pore width of 39.350 angstrom.

Example 2

Another Embodiment of a Ni—Mo—W-maleate Catalyst Precursor

A catalyst precursor of the formula (NH$_4$) {[Ni$_{2.6}$(OH)$_{2.08}$ (C$_4$H$_2$O$_4^{2-}$)$_{0.06}$](Mo$_{0.35}$W$_{0.65}$O$_4$)$_2$} was prepared as follows: 477.2 g of ammonium heptamolybdate (NH$_4$)$_6$ MO$_7$O$_{24}$.4H$_2$O was dissolved in 2.9 L of deionized water at room temperature. 666.6 g of ammonium metatungstate (NH$_4$)$_6$H$_2$W$_{12}$O$_{40}$.4.7H$_2$O was dissolved in 0.67 L water. The molybdate and tungstate solutions were added to 15.4 L deionized water. To this mixed molybdate and tungstate solution 1.9 L of a 7.0 wt-% NH$_4$OH (ammonia) solution was added so as to reach a pH in the range of 9-10. After this, the temperature was increased to 76 C with constant stirring. A second solution was prepared containing 1575 g of Ni(NO$_3$)$_2$. 6H$_2$O dissolved in 1.5 L deionized water. The nickel solution was then added in 25 minutes to the molybdate/tungstate solution while maintaining the temperature at 76 C. The resulting mixture was kept at 76° C. and stirred for half an hour. Subsequently, 95 g of maleic acid was added to the suspension and stirring was continued for another half an hour. The pH of the suspension was in the range of 5-6. After cooling to 60 C a blue-green precipitate was collected by filtration and dried by pressing it for 30 minutes at 150 psi in a filter press. At a Loss On Ignition (LOI) of 50 wt-% and a carver of 800 psi, the precipitate was mixed with 4 wt-% Methocel™ and extruded in a Wolf screw extruder with NAQ dies.

Figure 4:
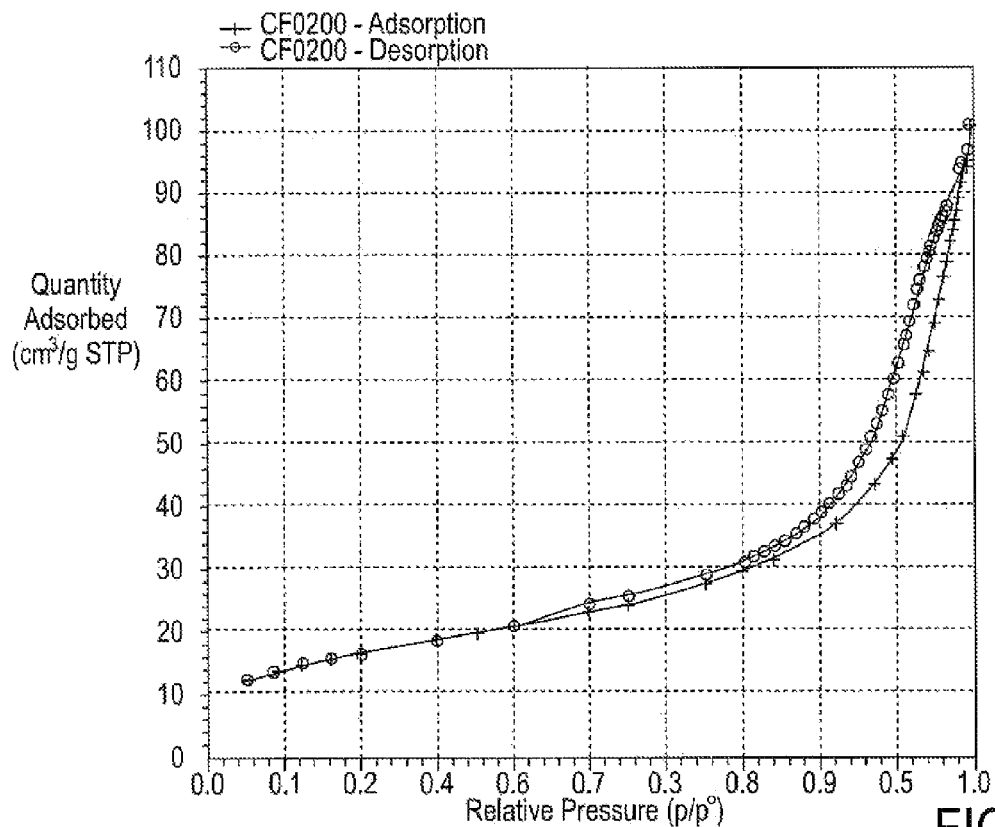
FIG. 4 is a graph illustrating the N2 adsorption (+) and desorption (-o-) isotherms of another embodiment of the catalyst precursor, showing a broad type H3 desorption hysteresis loop.
Figure 5:
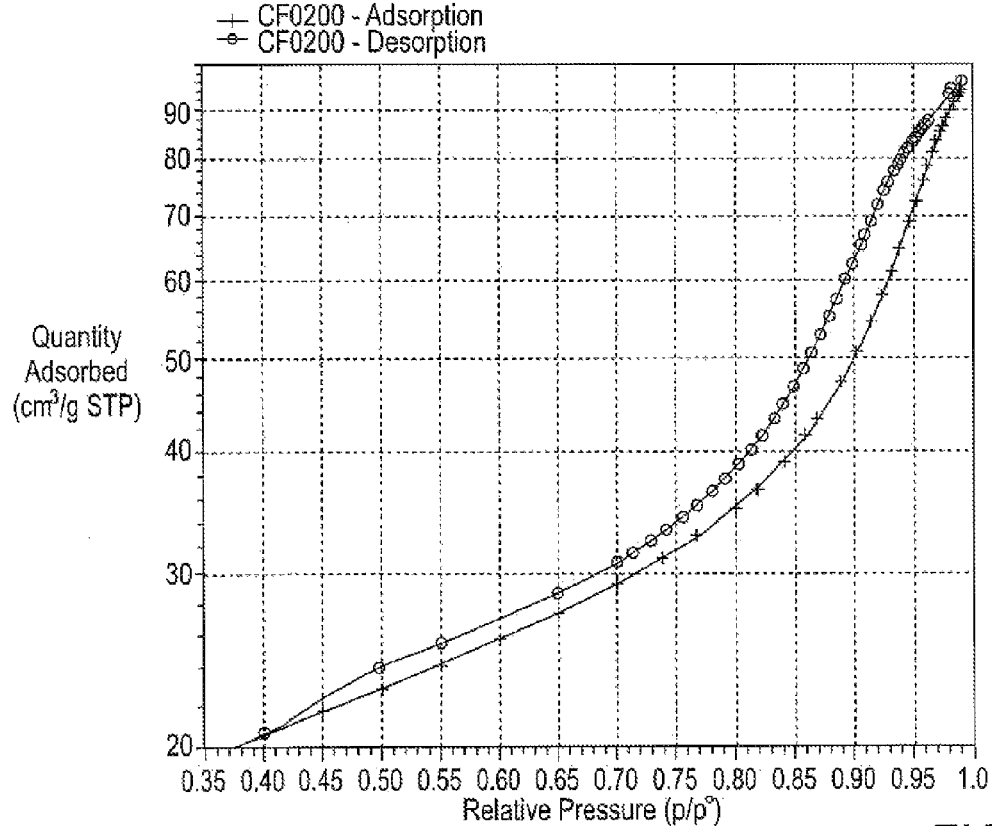
FIG. 5 is a graph illustrating the N2 adsorption (+) and desorption (-o-) isotherms of the catalyst precursor of FIG. 4 in the relative pressure range of 0.35 to 1.00.

The N2 adsorption desorption isotherm of the precursor of Example 2 is shown in FIGS. 4-5, also composed of a well defined hysteresis loop corresponding to the presence of mesoporosity. Other pore characteristics of this precursor include: Sample density of 1 g/cm$^3$. Surface area characteristics including single point surface area at P/P$°$=0.20 of 56.1297 m$^2$/g; BET surface area of 58.1421 m$^2$/g; BJH (Barret-Joyner-Halenda) adsorption cumulative surface area of pores between 17 and 3000 angstrom width of 56.2515 m$^2$/g; BJH desorption of 59.6379 m$^2$/g. Pore volume characteristics include single point desorption total pore volume of pores less than 2008 angstrom at P/P$°$=0.99 of 0.149469 cm$^3$/g; BJH adsorption cumulative surface area of pores between 17 and 3000 angstrom width of 0.145741 cm$^3$/g; and BJH desorption of 0.148929 cm$^3$/g. Pore size characteristics including desorption average pore width (4 V/A by BET) of 102.8301 angstrom; BJH adsorption average pore width of 103.635 angstrom; and BJH desorption average pore width of 99.889 angstrom.

Example 3

A Third Embodiment of a Ni–Mo–W-maleate Catalyst Precursor

A catalyst precursor of the formula (NH$_4$) {[Ni$_{2.6}$(OH)$_{2.08}$ (C$_4$H$_2$O$_4^{2-}$)$_{0.06}$](Mo$_{0.35}$W$_{0.65}$O$_4$)$_2$} was prepared as follows: 954.4 g of ammonium heptamolybdate (NH$_4$)$_6$ Mo$_7$O$_{24}$.4H$_2$O was dissolved in 5.8 L of deionized water at room temperature. 1333 g of ammonium metatungstate (NH$_4$)$_6$H$_2$W$_{12}$O$_{40}$.4.7H$_2$O was dissolved in 1.3 L water. The molybdate and tungstate solutions were added to 15.0 L deionized water. To this mixed molybdate and tungstate solution 5.0 L of a 7.0 wt-% NH$_4$OH (ammonia) solution was added until the pH reached 9.8. A second solution was prepared containing 2835 g of Ni(NO$_3$)$_2$.6H$_2$O dissolved in 6.38 L deionized water. A third solution was prepared by dissolving 284.9 g Ni(SO$_4$).6H$_2$O in 2.0 L water, and by subsequently adjusting the pH to 1.0 with concentrated sulfuric acid. After combination of the two nickel solutions, 110.0 g maleic acid dissolved in 0.60 L water was added to the nickel solution. The mixed molybdate/tungstate solution was combined with the nickel solution through an in-line, high-shear mixer which discharged the combined solution into 9.78 L deionized water. The resulting suspension was continuously stirred and maintained at 77 C. The pH of this suspension was raised to 6.5 through addition of an 7.0 wt-% NH4OH solution, and aged for 90 minutes with continuous stirring at 77 C. A blue-green precipitate was collected by filtration and dried at 115 C until Carver of 5000 psi. Subsequently the paste was wetted to a Carver of 1500 psi, 4 wt-% Methocel™ was added, and the paste was extruded in a Wolf screw extruder with NAQ dies.

Figure 6:
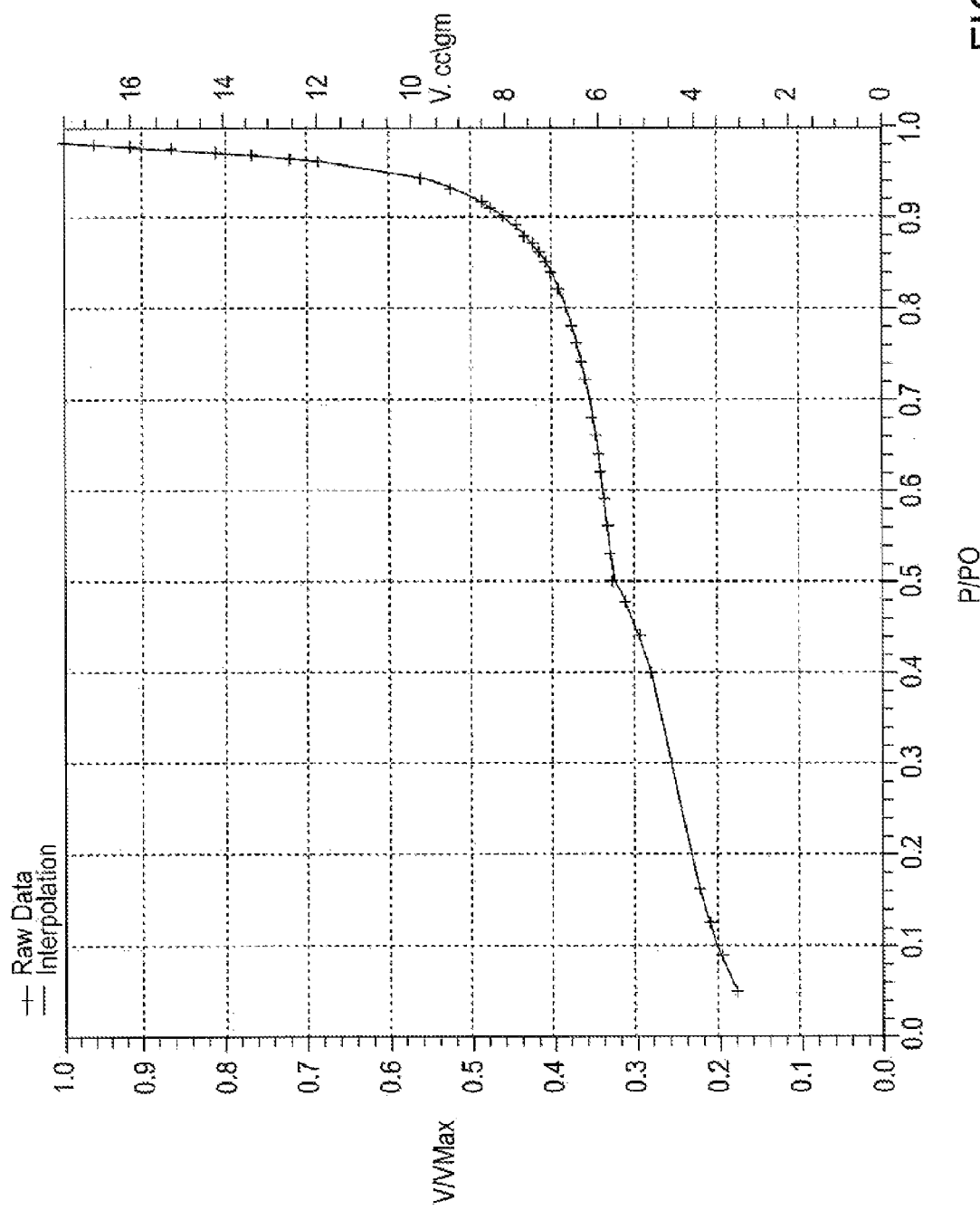
FIG. 6 is a graph illustrating the N2 adsorption (+) of a catalyst precursor that does not have a type IV isotherms.

FIG. 6 is a graph showing the isotherms of catalyst precursor prepared in Example 3, which do not fall into the pattern of a type IV isotherms.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A catalyst precursor, upon sulfidation, forms a bulk multi-metallic catalyst for hydrotreating a hydrocarbon feed under hydroprocessing conditions,
the catalyst precursor is formed by reacting to form a precipitate: at least two Group VIB metal compounds; at least a promoter metal compound; at least a ligating agent L; optionally at least a diluent, the promoter metal compound is nickel and the at least two Group VIB metal compounds are molybdenum and tungsten;
wherein the precipitate is formed without addition of any sulfur compounds to the reaction;
wherein the catalyst precursor is a hydroxide; and
wherein steps before sulfiding the catalyst precursor to form the bulk multi-metallic catalyst are carried out at a temperature of 200° C. or less for the catalyst precursor to remain a hydroxide before sulfidation to form the bulk multi-metallic precursor; and
wherein the catalyst precursor is characterized as having a poorly crystalline structure with disordered stacking layers with a type IV adsorption-desorption isotherms of nitrogen, with a hysteresis starting point value $P/P_o$ of about 0.35.

2. The catalyst precursor of claim 1, wherein the precursor has a type H3 hysteresis loop.

3. The catalyst precursor of claim 2, wherein the hysteresis loop has a plateau above $P/P_o$ of about 0.55.

4. The catalyst precursor of claim 1, wherein the catalyst precursor is characterized as having a mesoporous structure with a BET surface area ranging from 25 to 400 m²/g.

5. The catalyst precursor of claim 4, wherein the BET surface area ranges from 40 to 200 m²/g.

6. The catalyst precursor of claim 5 wherein the BET surface area ranges from 60 to 150 m²/g.

7. The catalyst precursor of claim 1, wherein the catalyst precursor is characterized as having a mesoporous structure with an average pore size ranging from 2 nm to 200 nm.

8. The catalyst precursor of claim 7, wherein the average pore size ranges from 5 to 150 nm.

9. The catalyst precursor of claim 8, wherein the average pore size ranges from 10 to 125 nm.

10. The catalyst precursor of claim 1, wherein the catalyst precursor is characterized as having a mesoporous structure with a pore volume of more than 0.01 cm³/g.

11. The catalyst precursor of claim 10, wherein the pore volume ranges from 0.01 to 0.50 cm³/g.

12. The catalyst precursor of claim 11, wherein the pore volume ranges from 0.02 to 0.20 cm³/g.

13. The catalyst precursor of claim 12, wherein the pore volume ranges from 0.05 to 0.15 cm³/g.

14. The catalyst precursor of claim 1, wherein the catalyst precursor has a compact bulk density of at most 1.6 g/cc.

15. The catalyst precursor of claim 1, wherein the catalyst precursor has a compact bulk density of at most 1.4 g/cc.

16. The catalyst precursor of claim 1, wherein the catalyst precursor is of the formula $A_v[(M^P)(OH)_x(L)^n_y]_z(M^{VIB}O_4)$, and wherein:
A is at least one of an alkali metal cation, an ammonium, an organic ammonium and a phosphonium cation;
$M^P$ is nickel;
L is at the least a ligating agent,
$M^{VIB}$ is the at least a Group VIB metal selected from molybdenum, tungsten and combinations thereof, having an oxidation state of +6;
$M^P : M^{VIB}$ has an atomic ratio of 100:1 to 1:100;
$v-2+P*z-x*z+n*y*z=0$; and
$0 < y \leq -P/n$; $0 < x \leq P$; $0 < v \leq 2$; $0 < z$.

17. The catalyst precursor of claim 16, wherein L is at least one of carboxylates, enolates, and combinations thereof.

18. The catalyst precursor of claim 16, wherein $M^{VIB}$ is a mixture of at least two Group VIB metals.

19. The catalyst precursor of claim 16, wherein the optional ligating agent L is selected from carboxylates, carboxylic acids, aldehydes, ketones, aldehydes, hemiacetals, formic acid, acetic acid, propionic acid, maleic acid, malic acid, cluconic acid, fumaric acid, succinic acid, tartaric acid, citric acid, oxalic acid, glyoxylic acid, aspartic acid, alkane sulfonic acids, aryl sulfonic acids, maleate, formate, acetate, propionate, butyrate, pentanoate, hexanoate, dicarboxylate, and combinations thereof.

20. The catalyst precursor of any claim 16, wherein the optional at least a diluent is selected from the group of titania, sodium silicate, potassium silicate, silica gels, silica sols, silica gels, hydronium- or ammonium-stabilized silica sols, sodium aluminate, potassium aluminate, aluminum sulfate, aluminum nitrate, magnesium aluminosilicate clay, magnesium metal, magnesium hydroxide, magnesium halides, magnesium sulfate, magnesium nitrate, zirconia, cationic clay, anionic clays, zinc oxide, zinc sulfide, tetraethyl orthosilicate, silicic acid, niobia, titania, and combinations thereof.

* * * * *